United States Patent [19]

Stodder et al.

[11] Patent Number: 4,844,317
[45] Date of Patent: Jul. 4, 1989

[54] POSITION TRANSDUCER FOR USE WITH A PRINTER OR PLOTTER

[75] Inventors: Samuel A. Stodder, Encinitas; Robert D. Haselby, Escondido, both of Calif.

[73] Assignee: Hewlett-Packard Company, Palo Alto, Calif.

[21] Appl. No.: 77,475

[22] Filed: Jul. 24, 1987

[51] Int. Cl.$^4$ .............................................. B65H 20/00
[52] U.S. Cl. ..................................................... 226/137
[58] Field of Search ................. 226/8.45, 27, 33, 120, 226/137, 156

[56] References Cited

U.S. PATENT DOCUMENTS 4,153,190  5/1979  Marion ................................... 226/33
4,630,071  12/1986  Nakazawa .......................... 226/8 X

Primary Examiner—David Werner
Attorney, Agent, or Firm—William J. Bethurum

[57] ABSTRACT

A rigid link is provided between a plot medium (14) and a position transducer (50) so that accurate plot medium advance measurement can be attained. The device (30) comprises a movable carriage (42) and an arm-like extension (38) that juts out from the carriage to the plot medium. A friction hold is made between the extension arm and the plot medium by applying a force to the extension arm normal to the plot medium by means of an electromagnet (33) which includes a coil (34), the extension arm serving as the armature. The electromagnet is located beneath the platen (12) which supports the medium on a base (32) which also supports the carriage.

With the electromagnet activated, the extension arm is held against the plot medium. As the plot medium is advanced by a plot medium drive system (20), the extension arm and carriage are pulled along. Plot medium advance is stopped when the proper advance distance has been sensed by the position transducer. The electromagnet is then deactivated and the extension arm and carriage are retracted by a return spring (48) to their original position. The process can then be repeated for the next plot medium advance. The length of a single move is short but sufficient for a scanning type plotter or printer.

24 Claims, 5 Drawing Sheets

POSITION TRANSDUCER FOR USE WITH A PRINTER OR PLOTTER

TECHNICAL FIELD

The present application relates in general to scanning-type printers and plotters, and, in particular, to incrementally advancing plot media and enabling incremental position feedback to be attained.

BACKGROUND ART

Incremental advance of plot media, such as paper, mylar, and other printable materials, requires an accurate knowledge of the position of the medium with respect to the previous advance position in order to make logically consistent prints. The knowledge of such position must be within certain minimal tolerances, in order to avoid scan-to-scan position errors, which would degrade plot quality.

Prior solutions employ expensive, high tolerance plot media rollers as well as precision gearing or belts driven by either stepper motors or DC motors/encoder systems. However, such solutions are typically limited to accuracies which result in visible print inconsistancies at the print scan boundaries and are not able at present to achieve the accuracy required to eliminate this problem. Such required accuracy is only achieved at high accuracies on the order of 0.0001 inch or less.

Other solutions employ techniques which incrementally advance plot media by using optically sensed position feedback from registration marks printed on the plot media. This method leaves the marks on the finished plot, which can be objectionable to the user.

DISCLOSURE OF INVENTION

In accordance with the invention, a device is provided for incremental advance of the plot medium to a high accuracy without a high tolerance precision plot media drive system. The device of the invention provides a rigid link between the plot medium and a position transducer so that accurate plot medium advance measurement can be attained.

The device comprises a carriage and an arm-like extension that juts out from the carriage to the plot medium. A friction hold is made between the extension arm and the plot medium by applying a force to the extension arm normal to the plot medium. The underside of the extension arm is coated with an abrasive grit to increase the coefficient of friction between the plot medium and the extension arm. The normal force on the end of the extension arm is achieved by using the end of the extension arm to complete the magnetic circuit of an electromagnet which is located below the plot medium and the platen supporting the plot medium. The electromagnet poles have long surfaces in the direction of plot medium travel so that the magnetic forces are normal to the plot medium when the extension arm end is located on any point along the length of the electromagnet.

The device of the invention operates as follows: A plot medium is inserted between the electromagnet/platen surface and the extension arm. The electromagnet is activated, causing the extension arm to be held tightly to the surface of the plot medium. The plot medium is then advanced by a plot medium drive system. As the plot medium is advanced, the extension arm and carriage are pulled along. Plot medium advance is stopped when the proper advance distance has been sensed by the position transducer. The electromagnet is then deactivated and the extension arm and carriage are retracted by a return spring to their original position. The process can then be repeated for the next plot medium advance. The length of a single move is short but sufficient for a scanning-type printer or plotter.

The device of the invention eliminates raster banding due to plot medium advance error in raster-type (e.g., ink-jet or dot matrix) printers and plotters.

The plot medium drive system employed by the device of the invention needs high resolution, but does not need high accuracy, thereby saving the expense of a high accuracy drive system. Only the position transducer needs to be highly accurate, and this is readily accomplished with existing photolithography processes.

For incremental plot medium positioning, the position transducer need only read a start and a finish point when the system includes a high resolution plot medium drive system. Thus, the position transducer can be much simpler than a linear encoder-type position transducer.

Finally, plot medium to drive wheel slippage can occur while advancing without affecting the positioning accuracy. This is due to the fact that the final position feedback source is at the paper, rather than at a rotary encoder located at the motor, which would be the case in a more conventional scheme.

BEST MODES FOR CARRYING OUT THE INVENTION

Figures 1, 4, 6:
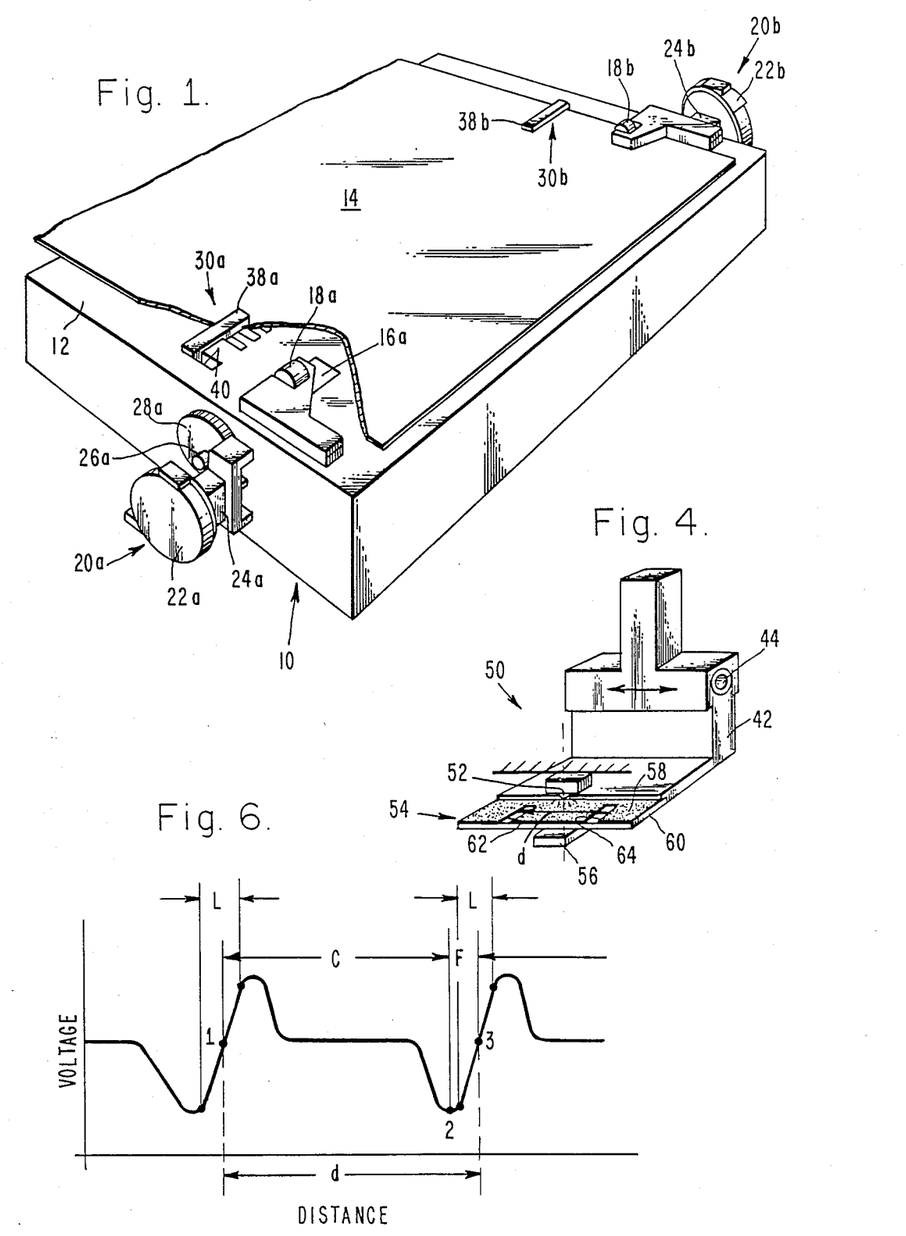
FIG. 1 is a perspective view of a portion of a plotter employing the mechanism of the invention.
FIG. 4 is a perspective view of the carriage portion of the device of the invention, depicting the sensing system and the direction of motion and extent of travel of the carriage.
FIG. 6, on coordinates of voltage (ordinate) and distance (abscissa), is a plot depicting the medium advance sensor output.

Referring now to the drawings wherein like reference numerals designate like elements throughout, a portion of a plotter is depicted generally at 10 in FIG. 1. The portions shown include a platen 12 for supporting a medium 14, a portion of which is shown cut-away, a pair of independently-driven drive wheels 16a, 16b (one of which is visible in the cut-away portion of the medium) and a corresponding pair of pinch rollers 18a, 18b, which together move the medium, and a pair of drive mechanisms 20a, 20b. Drive mechanism 20a includes a rotary encoder 22a, a motor 24a and a drive shaft 26a coupled to the motor by a gear 28a. Drive mechanism 20b includes a set of corresponding components.

In accordance with the invention, there is provided on each side of the medium 14 a medium advance feedback device 30a, 30b. The medium advance feedback device 30, depicted in greater detail in FIGS. 2 and 3, comprises a base 32 which supports an electromagnet 33 comprising a core 34, within which is an electromagnet coil and bobbin 36. An extension arm 38 (visible in FIG. 1) comprises the armature of the electromagnet 33, and extends through a slot 40 in the platen 12 in cooperative association with the electromagnet.

Figure 2:
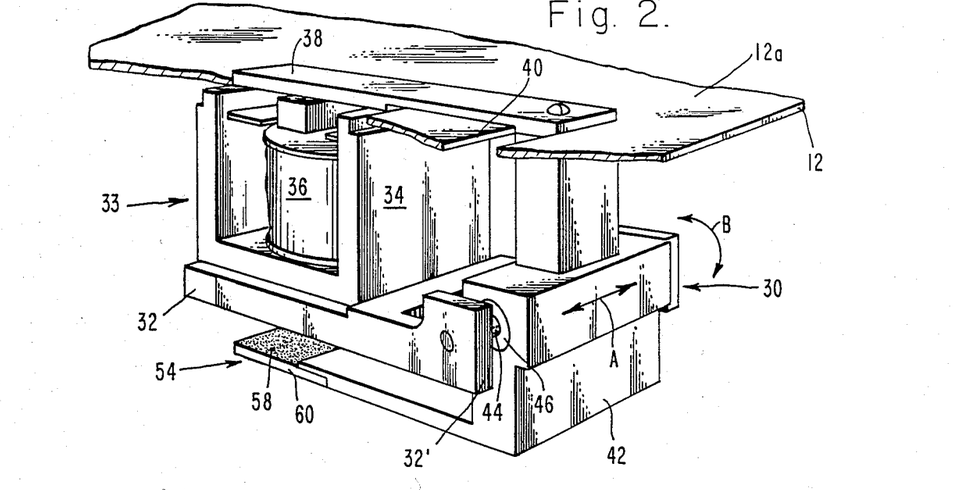
FIG. 2 is a perspective view of a portion of the device of the invention, viewed from above the platen.
Figures 3, 5:
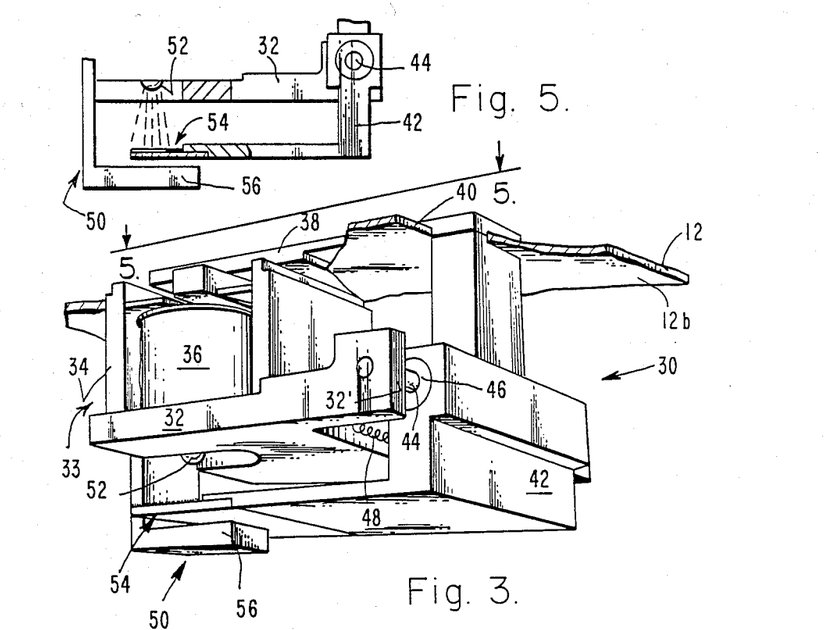
FIG. 3 is a perspective view of a portion of the device of the invention, viewed from beneath the platen.
FIG. 5 is a cross-sectional view taken along the line 5—5 of FIG. 3, showing the sensing system.

The base 32 also supports a carriage 42 which is translatable (shown by double headed arrow A) and rotatable (shown by double headed arrow B) on a shaft 44 through a linear bearing 46. The carriage 42 supports the extension arm 38 in association with the electromagnet 33.

Leads (not shown) provide power input to the electromagnet.

A spring 48 between the base 32 and the carriage 42 provides a retracting force on the carriage to return the carriage to side 32' of the base.

A sensing system 50, shown more clearly in FIGS. 4 and 5, preferably comprises a photoemitter 52, such as a light emitting diode (LED), a reference plate 54, a photo-receiver 56, an optical sensor output (not shown) and leads (not shown) for providing power to the system. The photoemitter 52 and dual photosensor 56 having sections 56a, 56b (seen in FIG. 9) may comprise any of the commerically available components.

The reference plate 54, as seen in FIG. 4, comprises a metal layer 58 deposited on a glass plate 60. The metal layer 58 is provided with two slits 62, 64, disposed parallel to each other and normal to the direction of translation. The two slits 62, 64 are separated by a distance d and have a width determined by the photoreceiver 56 as described below. The slits 62, 64 are fabricated employing conventional photolithography to mask a patterned area and etch away unprotected metal.

Figure 9:
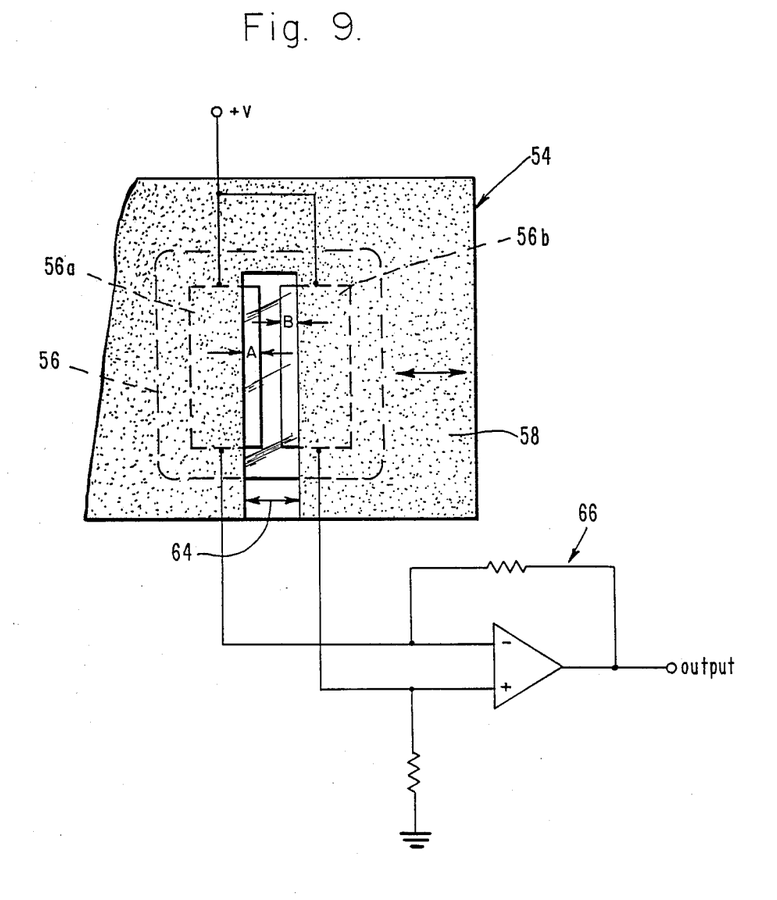
FIG. 9 is a plan view, partially diagrammatic, of a portion of a reference slot and associated electrical circuitry used in conjunction with the sensing system.

The optical sensor 50 functions as the position transducer of the device 30 of the invention. Slits 62, 64 establish the move length reference for the incremental advance system. As the glass reference plate 54 is passed between the photoemitter 52 and the dual receiver 56, the output signal seen in FIG. 6 results. The waveform in FIG. 6 develops when the photo-current generated at the exposed portion A of photoreceiver section 56a is subtracted from the photo-current generated at the exposed portion B of the photoreceiver section 56b, as shown in FIG. 9.

The exposed portion A, B of each photoreceiver section 56a, 56b is determined by the position of slit 62 or 64. The photoemitter 52 is stationary with respect to the photoreceiver 56 and would illuminate both sections essentially uniformly were it not for the glass reference plate 54 coated with metal 58 so as to define slits 62, 64. The circuit 66 seen in FIG. 9 subtracts the photocurrents from each section 56a, 56b and converts the resulting value to the voltage waveform seen in FIG. 6. The linear regions L are essentially identical and displaced from each other by the advance distance d. The width of the linear regions L is determined by the width of the slits 62, 64. This is only true if the gap between the dual receiver section 56a, 56b is less than the slit width. Also, the width of each of the receiver sections 56a, 56b must be equal to or greater than the slit width.

The output signal from the optical sensor 50 can be used with the medium-moving system 20 to provide an accurate incremental advance. The drive system 20 (rotary encoder 22, motor 24, gearing 28, drive shaft 26, drive wheel 16 and pinch roller 18), as described in greater detail below, is used to coarse advance the medium 14, which causes the optical sensor voltage output, measured along the ordinate (Y-axis) to move from Point 1 to Point 2, the distance along the abscissa (X-axis). It will be seen that Point 1 is at a first predetermined level, conveniently 0 volts, while Point 2 is at a second predetermined level, conveniently the minimum (or most negative) voltage. The drive system is then used to fine step the medium position as the sensor voltage moves from Point 2 toward Point 3. As Point 3, a third predetermined voltage, is approached, the voltage output is equal to the voltage at Point 1, and the fine stepping is stopped. Thus, the medium advance mechanism has advanced from one slit 62 to the other slit 64.

The entire sequence of events is as follows:

1. Both electromagnets 33 (each associated with a medium advance sensor) are activated, thus causing the extension arms 38a, 38b of each medium advance sensor 30a, 30b to be tightly held to the medium 14.

2. Initial voltages are read from each device 30a, 30b (Point 1 in FIG. 6).

3. A coarse advance of the medium 14 is now made with both drives 20a, 20b with encoders 22a, 22b, as a reference. The coarse advance is just short of the nominal distance, which is based on the distance d (FIG. 4) between the slits 62, 64. The extension arms 38a, 38b of both medium advance device 30a, 30b will be pulled along with the medium 14, causing the sensor outputs to vary from Point 1 to Point 2 of FIG. 6.

4. Both drives 20a, 20b are instructed to advance one high resolution step each, reading each sensor voltage after each step.

5. Step 4 is repeated until the voltage read is equal to the initial voltage for each medium advance device 30a, 30b (Point 3 in FIG. 6).

6. The electromagnet current is shut off and the extension arm 38a, 38b of each medium advance sensor 30a, 30b lift and return to its initial position (Point 1 of FIG. 6) due to retraction of the return spring 48.

7. Steps 1 through 6 are repeated for additional advances.

Figure 7:
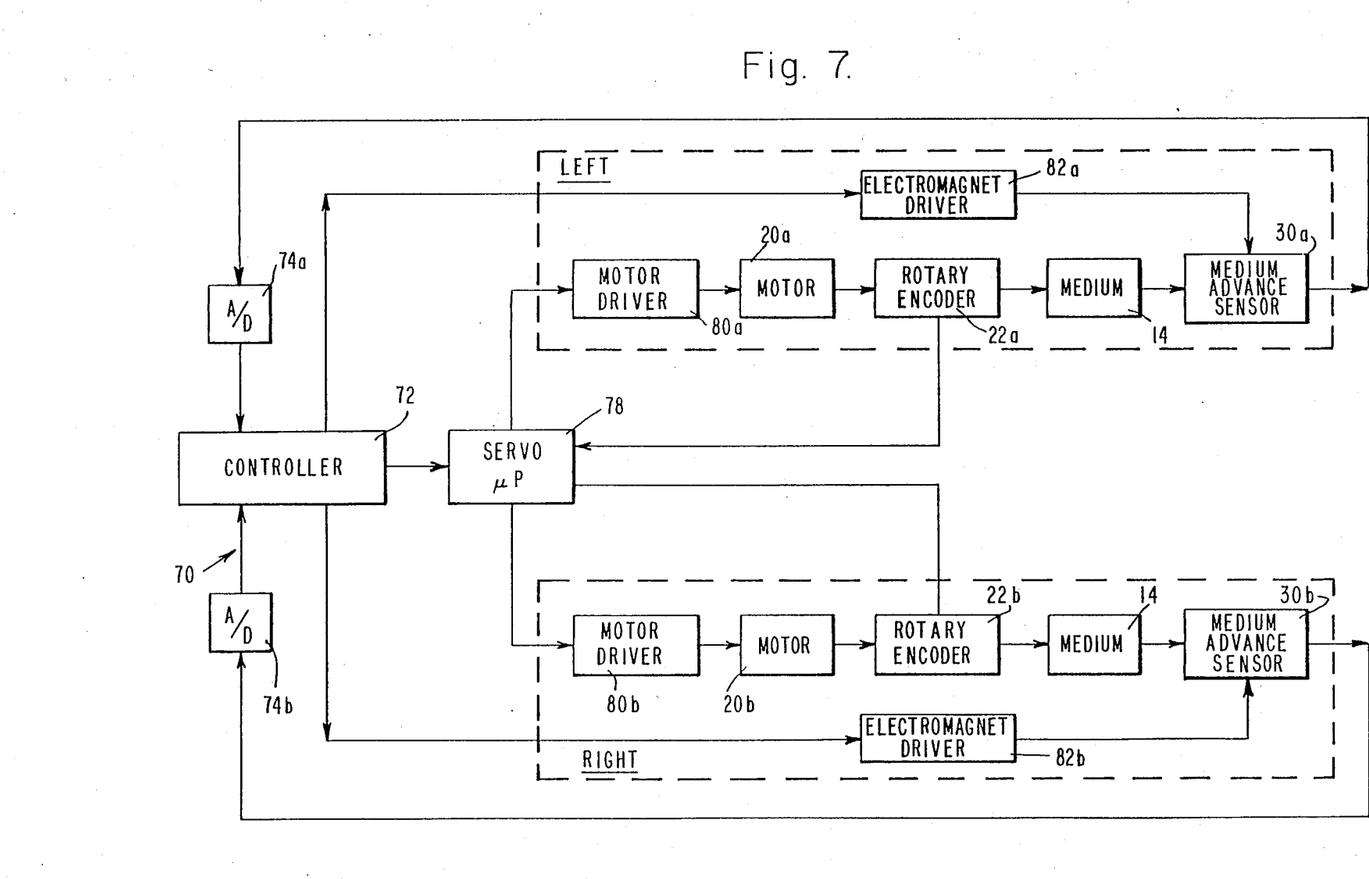
FIG. 7 is a schematic block diagram of the medium advance system of the invention.

FIG. 7 depicts a block diagram of the plot medium advance system 70. A controller 72 provides the sequencing of events for the operation of the medium advance system of the invention. The controller 72 activates each electromagnet 33 by instructing the electromagnet driver 82a, 82b to switch the current on to the electromagnet coil 36 associated therewith. The controller 72 sends move reference commands to the servo-microprocessor 78, which compares the position feedback from the rotary encoders 22a, 22b with the move reference command to determine the error signal. The error signal is output to the motor drivers 80a, 80b, utilizing conventional servo technology. The controller 72 reads the medium advance sensors 30a, 30b by use of the analog-to-digital converters 74a, 74b. In this manner, the controller 72 can send out additional move reference commands using the medium advance sensors 30a, 30b as a secondary feedback path for fine step control of the medium 14.

Figure 8:
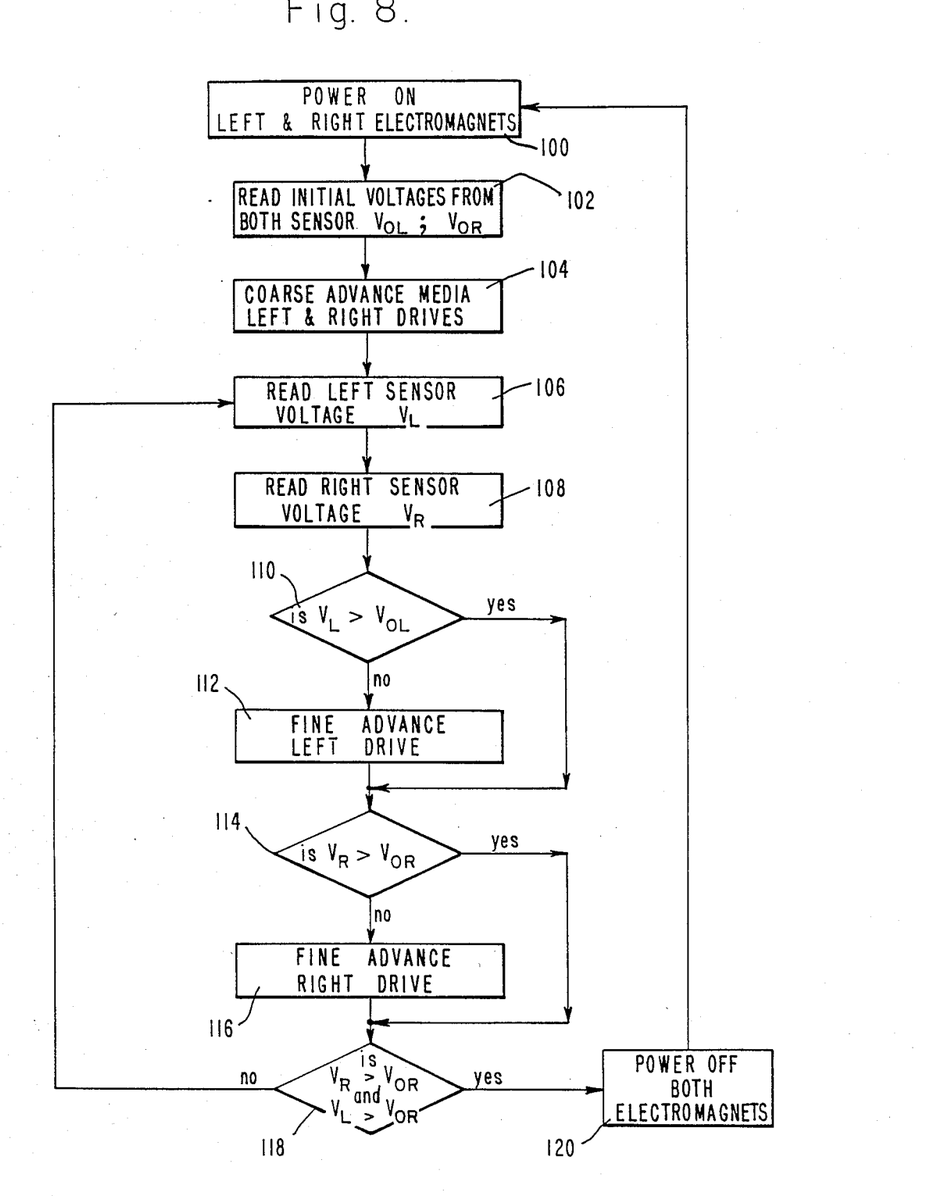
FIG. 8 is a flow chart of the operation of the medium advance system of the invention.

FIG. 8 depicts a flow chart of the plot medium advance system 70 of the invention. Each electromagnet 33 is powered on in step 100. Initial voltages (Point 1 in FIG. 6) are read from both sensors 50a, 50b in step 102. The left and right drive systems 20a, 20b each perform a coarse advance of the medium 14 in step 104, and the voltage of one of the sensors 50 (here, preselected to be the left sensor 50a) is read in step 106. The voltage of the other sensor (here, the right sensor 50b) is then read in step 108.

In step 110, the voltage read in step 106 is compared with the voltage read in step 102. If the voltage read in step 106 is less than or equal to that read in step 102, then the left drive system 20a performs a fine advance (toward Point 3 in FIG. 6) in step 112. If the voltage read in step 106 is greater than that read in step 102, then step 112 is omitted, and the system continues to step 114.

In step 114, the voltage read in step 108 is compared with that read in step 102. If the voltage read in step 108 is less than or equal to that read in step 102, then the right drive system 20b performs a fine advance (toward Point 3 in FIG. 6) in step 116. If the voltage read in step 108 is greater than that read in step 102, then step 116 is omitted, and the system continues to step 118.

In step 118, the voltage read in step 106 is compared with that read in step 102 and the voltage read in step 108 is compared with that read in step 102. If both voltages are not greater than the initial voltages, then the system recycles to step 106 to continue the fine advance. If both voltages are greater than the intial voltages, then the system shuts off the power to both electromagnets, and the system recycles to step 100 to begin a new advance.

The system 70 described above makes use of two independent media advance sensors 50a, 50b and two independent media drive systems 20a, 20b. This scheme allows for accurate incremental medium advance without the need to rely on an accurate drive wheel or accurate gearing. The extra medium drive system and medium advance sensor prevent advance error associated with dimensional variations along the length of the drive wheel 16a, 16b. A single drive system with a single medium advance sensor could be used if the application did not require the additional accuracy.

The device 30 is novel for two reasons: first, medium position feedback is attained by using a mechanical link 38 and 42 that translates exactly as the plot medium 14 translates. Medium feedback is therefore free of the errors inherent in the plot medium drive rollers, gears, etc. Second, visually disturbing registration marks printed on the plot medium are not needed. These marks are required by methods utilizing optical position feedback from the medium.

Incremental advance of the plot medium 14 to high accuracy of 0.0001 inch and better is attained without a high tolerance precision plot medium drive system. Elimination of raster banding due to plot medium advance error is avoided in raster-type (i.e., ink-jet and dot matrix) printers and plotters.

The separation of the arm 38 in the non-activated position must be large enough to allow slippage of plot medium 14 therebeetween it and the surface of the platen 12 for loading the plot medium. However, this distance must be held small enough so that an optimal electromagnet design is utilized. As the separation becomes larger, a more powerful electromagnet is required to return the arm 38 to the surface of the plot medium 14. This is because the tractive force is dependent on the inverse square of the separation distance.

The underside of the arm 38 may be coated with a grit to increase friction between the gripping mechanism and the medium 14. Other friction-increasing materials or appropriate friction-increasing processes to the arm 38 may alternatively be used.

A number of variations of the plot medium to position transducer link may be made. For example, a small carriage that translates in the direction of the medium could be located just above the medium 14. A small arm would extend from the carriage to the medium. A small roller rolls on top of the extension arm as the extension arm moves under it. By applying a force to the roller with a solenoid, a normal force results between the extension arm and the plot medium. A friction bond results which insures that the extension arm and the carriage move exactly as the plot medium. Unwanted friction that develops between the medium and the platen could be reduced by utilizing a low friction material or roller, slider, etc., below the medium.

Use of a device that grips the edge of the plot medium 14 may be employed. Both the below plot medium part of the gripper and the above plot medium part of the gripper would translate with the plot medium 14.

A controlled vacuum could be used to hold a device tight to the paper.

Any device that is capable of bonding an arm of a position transducer to the plot medium 14 without causing significant loading to the plot medium in the direction of medium travel is essentially using the same concept as the plot medium to position transducer link disclosed herein.

INDUSTRIAL APPLICABILITY

The plot medium to position transducer link 30 of the invention is expected to find use in conjunction with raster scanning plotters, printers and image scanners for accurate incremental media advance.

Thus, there has been disclosed a mechanism for accurately moving a medium and measuring the position thereof very accurately (to 0.0001 inch). Various modifications and changes of an obvious nature will occur to those of ordinary skill in the art, and all such modifications and changes not deviating from the spirit and scope of the invention as defined by the appended claims are intended to be included therein.

What is claimed is:

1. A position transducer for use with printers and plotters including means for supporting a plot medium and means for moving said medium thereon, said moving means including first means associatively coupled to said medium for driving said medium and second means associatively coupled to said first means for directing said first means, said position transformer:
   (a) releasable means for gripping said medium, said gripping means adapted to travel a predetermined distance with said medium during advance of said medium;
   (b) means for engaging and releasing said gripping means with respect to said medium;
   (c) means for returning said gripping means to an intial position following said advance;
   (d) means for sensing the extent of advance of said gripping means;
   (e) means for determining from said extent of advance of said gripping means any additional advance of said medium required to attain said predetermined distance; and (f) means for controlling said additional advance of said medium.

2. The position transducer of claim 1 wherein said second means comprises two independent drive mechanisms.

3. The position transducer of claim 1 wherein said second means comprises a single drive mechanism.

4. The position transducer of claim 1 further including means for providing a force applied to said gripping means normal to said means for supporting said plot medium, for said extent of advance of said gripping means.

5. The position transducer of claim 4 wherein said releasable means comprises a releasable extension arm comprising an armature of an electromagnet for gripping said medium, said electromagnet also including a core for activating said armature.

6. The position transducer of claim 1 said return means comprises a spring.

7. The position transducer of claim 1 further including friction-increasing means between said gripping means and said medium.

8. A position transducer for use with printers and plotters including a platen for supporting a plot medium and a medium advance system comprising a set of drive wheels and a corresponding set of pinch rollers which together move said medium and at least one set of drive mechanisms including a motor, a rotary encoder and a drive shaft coupled to said motor, said position transducer comprising:
(a) releasable means for gripping said medium, said gripping means adapted to travel a predetermined distance with said medium during advance of said medium;
(b) means for engaging and releasing said gripping means with respect to said medium;
(c) means for returning said gripping means to an intial position following said advance;
(d) means for sensing the extent of advance of said gripping means;
(e) means for determining from said extent of advance of said gripping means any additional advance of said medium required to attain said predetermined distance; and
(f) means for controlling said additional advance of said medium.

9. The position transducer of claim 8 comprising two independent drive mechanisms.

10. The position transducer of claim 8 comprising a single drive mechanism.

11. The position transducer of claim 8 further including means for providing a force applied to said gripping means normal to said platen, for said extent of advance of said gripping means.

12. The position transducer of claim 11 wherein said releasable means comprises a releasable extension arm comprising an armature of an electromagnet for gripping said medium, said electromagnet also including a core for activating said armature.

13. The position transducer of claim 8 said return means comprises a spring.

14. The position transducer of claim 8 further including friction-increasing means between said gripping means and said medium.

15. A position transducer for use with plotters including a platen for supporting a plot medium and a medium advance system comprising an independent set of drive wheels and a corresponding set of pinch rollers which together move said medium and an independent set of drive mechanisms including a motor, a rotary encoder and a drive shaft coupled to said motor, said position transducer comprising:
(a) a releasable extension arm comprising an armature of an electromagnet, said extension arm having a surface for gripping said medium and adapted to travel a predetermined distance with said medium during advance of said medium;
(b) said electromagnet adapted to engage and release said extension arm with respect to said medium and including a core;
(c) means for returning said extension arm to an intial position following said advance;
(d) means for sensing the extent of advance of said extension arm;
(e) means for determining from said extent of advance of said extension arm any additional advance of said medium required to attain said predetermined distance; and
(f) means for controlling said advance of said medium.

16. The position transducer of claim 15 said return means comprises a spring.

17. The position transducer of claim 15 wherein said sensing means comprises a reference plate having an opaque film provided thereon with two transparent slits spaced apart said predetermined distance, a photoemitter on one side of said plate and a dual photoreceiver on the opposite side thereof.

18. The position transducer of claim 17 wherein said determining means includes means for activating said photoemitter and means for receiving and subtracting signals from said dual photoreceiver.

19. The position transducer of claim 15 further including a grit coating on said surface of said releasable extension arm.

20. A medium advance device for use in a position transducer comprising:
(a) a base maintained beneath a platen supporting said medium;
(b) a movable carriage supported on said base and adapted to move a predetermined distance in the direction of movement of said medium;
(c) an electromagnet associated with said base, the core of which is supported on said base and the armature of which comprises an extension arm supported by said carriage, said extension arm extending through said platen and cooperatively associated with said medium and said core so as to grip said medium by a surface of said extension arm upon activation of said electromagnet;
(d) means for activating and deactivating said electromagnet;
(e) spring means between said base and said carriage for returning said carriage to an intial position;
(f) a sensing system comprising a reference plate having an opaque film provided with two transparent slits spaced said predetermined distance, a photoemitter on one side of said plate and a dual photoreceiver on the opposite said thereof; and
(g) means for activating said photoemitter and means for receiving and subtracting signals from said dual photoreceiver.

21. The device of claim 20 further including a grit coating on said surface of said extension arm.

22. A method of accurately advancing a medium on a printer or plotter having a platen for supporting a plot medium and a medium advance system comprising a set of drive wheels and a corresponding set of pinch rollers which together move said medium and at least one set of drive mechanisms including a motor, a rotary encoder and a drive shaft coupled to said motor, said method comprising:

(a) providing a pair of plot medium to transducer links comprising
  (i) releasable means for gripping said medium, said gripping means adapted to travel a predetermined distance with said medium during advance of said medium,
  (ii) means for engaging and releasing said gripping means with respect to said medium,
  (iii) means for returning said gripping means to an intial position following said advance,
  (iv) means for sensing the extent of advance of said gripping means,
  (v) means for determining from said extent of advance of said gripping means any additional advance of said medium required to attain said predetermined distance, and
  (vi) means for controlling said additional advance of said medium;
(b) activating said releasable means to cause said engaging means to grip said medium;
(c) reading an initial voltage from said sensing means;
(d) providing a coarse advance of said medium by said medium advance system;
(e) reading a new voltage from said sensing means;
(f) comparing said new voltage reading with said intial voltage reading;
(g) providing an additional fine advance of said medium by said medium advance system;
(h) repeating steps (e) through (g) until said new voltage reading is equal to said initial voltage reading;
(i) deactivating said releasable means;
(j) repeating steps (a) through (i) as needed to advance said medium.

23. A method of accurately advancing a medium on a printer or plotter having a platen for supporting a plot medium and and a medium advance system comprising an independent set of drive wheels and a corresponding set of pinch rollers which together move said medium and an independent set of drive mechanisms including a motor, a rotary encoder and a drive shaft coupled to said motor, said link comprising:

(a) providing a pair of plot medium to transducer links comprising
  (i) releasable extension arm comprising an armature of an electromagnet for gripping said medium, said extension arm adapted to travel a predetermined distance with said medium during advance of said medium,
  (ii) said electromagnet adapted to engage and release said extension arm with respect to said medium and including a core,
  (iii) means for returning said extension arm to an intial position following said advance,
  (iv) means for sensing the extent of advance of said extension arm,
  (v) means for determining from said extent of advance of said extension arm any additional advance of said medium required to attain said predetermined distance, and
  (iv) means for controlling said advance of said medium;
(b) activating said releasable extension arm to cause said armature to grip said medium;
(c) reading an initial voltage from said sensing means;
(d) providing a coarse advance of said medium by said medium advance system;
(e) reading a new voltage from said sensing means;
(f) comparing said new voltage reading with said intial voltage reading;
(g) providing an additional fine advance of said medium by said medium advance system;
(h) repeating steps (e) through (g) until said new voltage reading is equal to said initial voltage reading;
(i) deactivating said releasable extension arm;
(j) repeating steps (a) through (i) as needed to advance said medium.

24. The method of claim 23 wherein a sequence is begun by powering on each electromagnet of each transducer link, reading initial voltages from each sensing means, performing a coarse advance of said medium by each drive system, reading said new voltage of a first of said sensing means, reading said new voltage of a second of said sensing means, comparing said new voltage of said first sensing means with said initial voltage of said first sensing means, performing a fine advance of said medium by said first drive system only if said new voltage is less than that of said initial voltage, comparing said new voltage of said second sensing means with said initial voltage of said first sensing means, performing a fine advance of said medium by said second drive system only if said new voltage is less than that of said initial voltage, comparing said new voltages of both sensing means with the respective said initial voltages and if both new voltages are not greater than said initial voltages, then recycling said control means to reading a new voltage of said first sensing means, but if greater than said initial voltages, then shutting off power to said electromagnets, thereby enabling said gripping means to return to its original position, and repeating said sequence as necessary to advance said medium accurately.

* * * * *